United States Patent [19]

Booth et al.

[11] 4,209,142

[45] Jun. 24, 1980

[54] REMOTE TENSION-RELIEVING APPARATUS FOR SAFETY BELT RETRACTOR

[75] Inventors: Frederick C. Booth, Birmingham; Robert L. Stephenson, Sterling Heights, both of Mich.

[73] Assignee: Allied Chemical Corporation, Morris Township, Morris County, N.J.

[21] Appl. No.: 574,161

[22] Filed: May 2, 1975

[51] Int. Cl.² .................... A62B 35/00; B65H 75/48
[52] U.S. Cl. ............................ 242/107.6; 280/808; 297/475
[58] Field of Search ............... 242/107.2, 107.4 R, 242/107.6, 107.7; 280/801–808; 297/474–480

[56] References Cited
U.S. PATENT DOCUMENTS

| | | | |
|---|---|---|---|
| 3,172,700 | 3/1965 | Haas | 297/388 |
| 3,240,510 | 3/1966 | Spouge | 242/107.2 X |
| 3,833,238 | 9/1974 | Liard | 280/150 SB |
| 3,847,434 | 11/1974 | Weman | 242/107.2 X |
| 3,871,599 | 3/1975 | Takada | 242/107.2 |
| 3,930,682 | 1/1976 | Booth | 242/107.4 R X |

*Primary Examiner*—John M. Jillions

*Attorney, Agent, or Firm*—Roger H. Criss

[57] ABSTRACT

An improved tension-relieving apparatus for a shoulder belt of a vehicle safety belt system includes: a housing, a shoulder belt support, a locking means, a force transmitting means and an actuating means. The housing has an approximately U-shape including a back wall and two sidewalls. The shoulder belt support extends between the sidewalls of the housing. The shoulder belt moves partially around the shoulder belt support as the shoulder belt is unwound from the retractor and rewound into the retractor. The locking means is disposed adjacent to the shoulder belt support. The locking means includes a clamp pivotably disposed within the housing and extending between the sidewalls of the housing. The clamp, in its locking position, prevents movement of the shoulder belt around the shoulder belt support. The force transmitting means is mounted in the housing adjacent to the locking means and moves the clamp between its locking position and its unlocking position. The clamp in its locking position removes tension on the shoulder belt produced by the rewind mechanism of the retractor. The actuating means is located in the vehicle and actuates the force transmitting means.

4 Claims, 5 Drawing Figures ent of the remote tension-relieving apparatus of the present invention.

FIG. 2 is a vertical section of FIG. 1 along the lines 2—2 of FIG. 1.

FIG. 3 is an isometric view of a second embodiment of the remote tension-relieving apparatus.

FIGS. 4 and 5 are simplified illustrations for both the first and second embodiments, showing the apparatus in a vehicle.

REMOTE TENSION-RELIEVING APPARATUS FOR SAFETY BELT RETRACTOR

BACKGROUND OF THE INVENTION

The present invention relates to a vehicle safety belt system adapted to restrain an occupant in his seat. More particularly, this invention relates to a remote tension-relieving apparatus for relieving tension on a shoulder belt when in use by an occupant of a vehicle.

Safety belt systems typically include a shoulder belt and a retractor having a rewind mechanism biased to rewind the shoulder belt into the retractor. The tension on the shoulder belt is produced by the rewind mechanism of the retractor. The present invention is adapted to be located in a position remote from the retractor and is adapted to overcome the tension on the shoulder belt caused by the rewind mechanism in the retractor when the occupant is using the shoulder belt.

The present invention is an improvement of a safety belt tension-relieving apparatus disclosed in FIGS. 1-3 of United States Patent No. 3,930,682 entitled "Safety Belt Tension-Relieving Apparatus" filed Sept. 30, 1974 in the name of F. Booth.

SUMMARY OF THE INVENTION

The present invention is adapted for use in a vehicle safety belt system which restrains an occupant in a vehicle. The safety belt system includes a shoulder belt and a retractor having a rewind mechanism biased to rewind the shoulder belt on a reel of the retractor. The improved tension-relieving apparatus of the present invention includes: a housing, a shoulder belt support, a locking means, a force transmitting means and an actuating means.

The housing has an approximately U-shaped including a back wall and two sidewalls. The sidewalls extend approximately perpendicularly from the back wall. The shoulder belt support is disposed within the housing and extends between the sidewalls of the housing. The shoulder belt moves partially around the shoulder belt support as the shoulder belt is unwound from the retractor and rewound into the retractor. The locking means is disposed adjacent to the shoulder belt support. The locking means includes a clamp pivotably disposed within the housing. The clamp extends between the sidewalls of the housing and has a locking position and an unlocking position. The clamp is movable between its locking position and its unlocking position. The clamps in its locking position prevents movement of the shoulder belt around the shoulder belt support. The force transmitting means is mounted in the housing adjacent to the locking means. The force transmitting means has mechanical means connected to the locking means. The force transmitting means moves the clamp between its locking position and its unlocking position. The clamp in its locking position removes tension on the shoulder belt produced by the rewind mechanism of the retractor. The actuating means is located in the vehicle remote from the housing. The actuating means has electrical means connected to the force transmitting means for actuating the force transmitting means.

DETAILED DESCRIPTION

Figure 1:
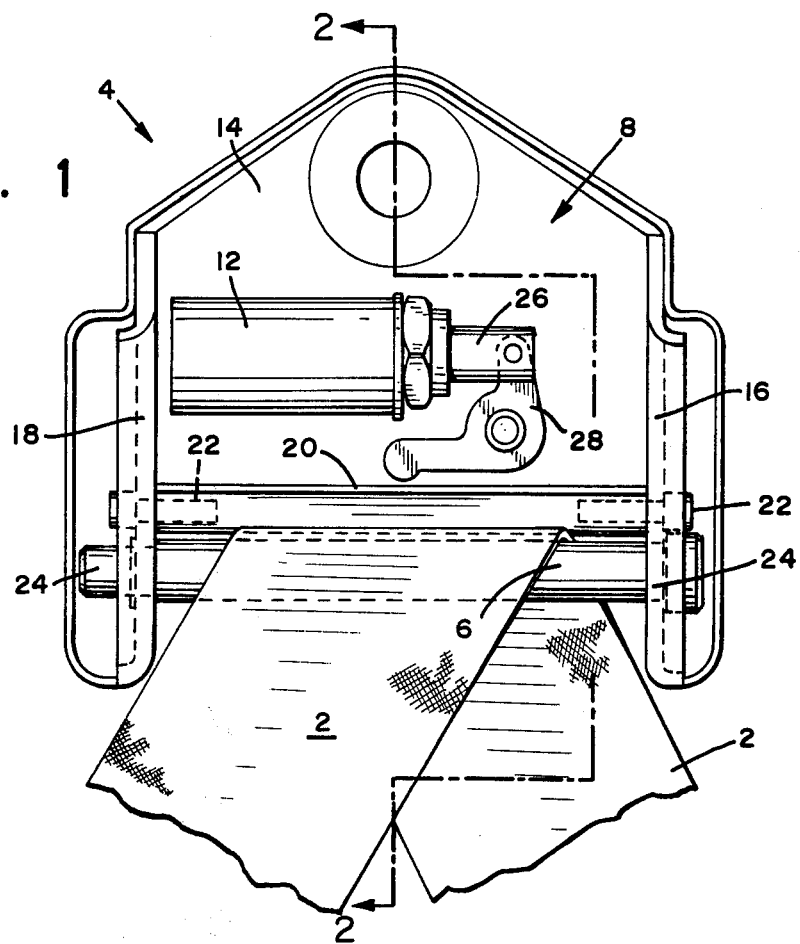
FIG. 1 is a front elevational view of a first embodiment of the remote tension-relieving apparatus of the present invention.

Referring to FIGS. 1-5, the present invention is adapted for use in a vehicle safety belt system which restrains an occupant in a vehicle. The safety belt system includes a shoulder belt 2 and a retractor 3 having a rewind mechanism biased to rewind the shoulder belt 2 on a reel of the retractor 3. The improved tension-relieving apparatus of the present invention includes: a housing 4, a shoulder belt support 6, a locking means 8, an actuating means 10 and a force transmitting means 12.

The housing 4 may be located in a remote position from the retractor 3. The housing 4 has an approximately U-shape including a back wall 14 and two sidewalls 16 and 18. The sidewalls 16 and 18 extend approximately perpendicularly from the back wall 14. The shoulder belt support 6 is disposed within the housing 4 and extends between the sidewalls 16 and 18 of the housing 4. The shoulder belt 2 moves partially around the shoulder belt support 6 as the shoulder belt 2 is unwound from the retractor 3 and rewound into the retractor 3. The locking means 8 is disposed adjacent to the shoulder belt support 6. The locking means 8 includes a clamp 20 pivotably disposed within the housing 4. The clamp 20 extends between the sidewalls 16 and 18 of the housing 4. The clamp 20 has a locking position and an unlocking position. The clamp 20 is movable between its locking position and its unlocking position. The clamp 20 in its locking position clamps or presses a portion of the shoulder belt 2 against the support 6 and thereby prevents further movement of the shoulder belt 2 around the shoulder belt support 6.

The force transmitting means 12 may be a solenoid mounted in the housing 4 adjacent to the locking means 8. The force transmitting means 12 has mechanical means connected to the locking means. The force transmitting means 12 moves the clamp 20 between its unlocking position wherein it merely rides loosely on the shoulder belt 2 and its locking position wherein the force transmitting means 12 causes the clamp 20 to press against a portion of the shoulder belt 2 and the shoulder belt support 6. The clamp 20 in its locking position removes tension on the shoulder belt 2 produced by the rewind mechanism of the retractor. The rewind mechanism in the retractor is well-known in the art. An example of such a rewind mechanism is disclosed in U.S. Pat. Nos. 3,610,361 (reference numeral 210); 3,741,496 (reference numeral 13); and 3,797,603 (reference numeral 64). The actuating means is located in the vehicle remote from the housing 4. The actuating means has electric means, such as electric wires, connected to the force transmitting means 12 for actuating force transmitting means 12.

Figure 2:
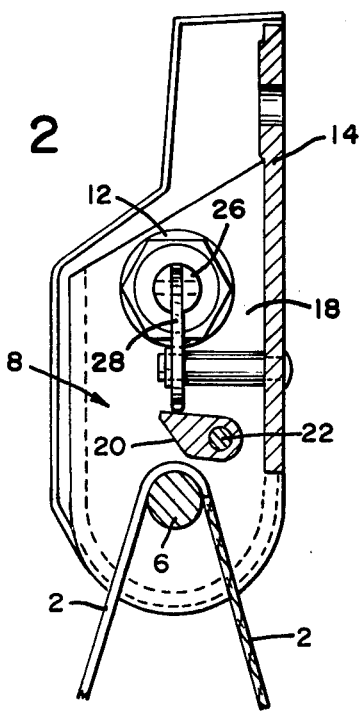

In the first embodiment illustrated in FIGS. 1-2, the solenoid has a longitudinal axis which is disposed approximately parallel to a longitudinal axis of the support 6 and a longitudinal axis of the clamp 20. In the first embodiment, the plunger of the solenoid has movement approximately parallel to the longitudinal axis of the support and the clamp 20.

Figure 3:
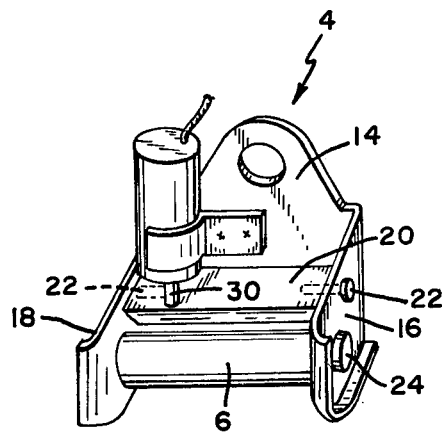

In the second embodiment illustrated in FIG. 3, the solenoid has a longitudinal axis which is disposed approximately perpendicular to a longitudinal axis of the support 6 and the clamp 20. In the second embodiment, the plunger has movement in a direction approximately perpendicular to the longitudinal axis of the support 6 and the longitudinal axis of the clamp 20.

The clamp 20 has axles 22 at either end extending into the sidewalls 16 and 18 of the housing 4, thereby allowing the clamp 20 to pivot. Stop means may be provided to limit the travel of the clamp in its pivoting action. The support 6 may have axles at each end extending into the sidewalls 16 and 18 of the housing 4 and rotatably positioned in the housing 4, thereby allowing the support 6 to freely rotate with reference to the sidewalls 16 and 18.

In the first embodiment, illustrated in FIGS. 1-2, the locking means 8 includes: a plunger 26 of the solenoid and a linkage means. Referring to FIG. 1, the linkage means may be an L-shaped bracket 28, one end of which is connected to the plunger 26 and the other end of which is disposed adjacent to the clamp 20. In the second embodiment, illustrated in FIG. 3, the locking means 8 uses only a plunger 30 of the solenoid which makes direct contact with the clamp 20.

Figure 4:
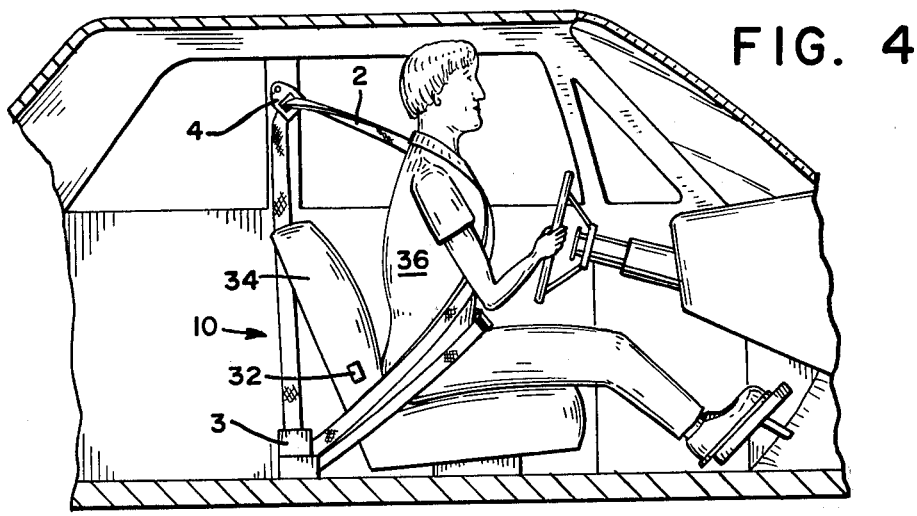
Figure 5:
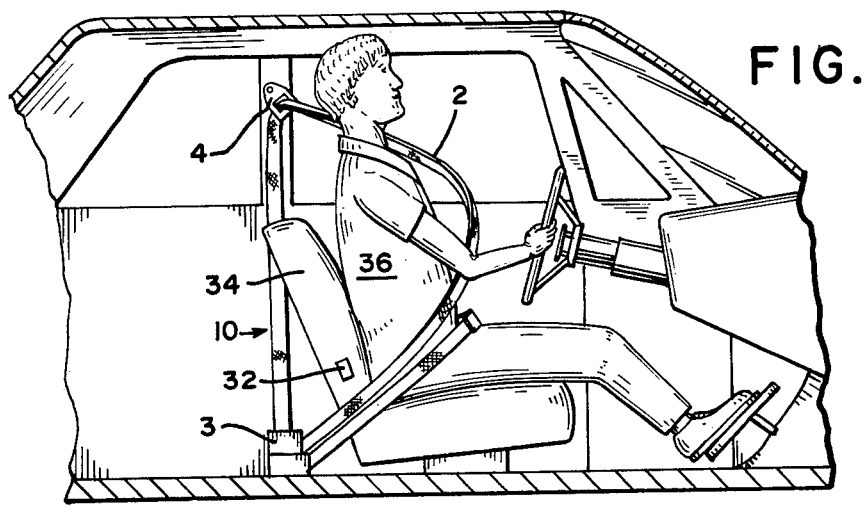

Referring to FIGS. 4 and 5, the actuating means 10 may be a pressure sensing means, such as a pressure sensitive switch 32, imbedded in the back portion 34 of the vehicle seat, preferably adjacent to the lower back of the seated occupant 36, as disclosed in FIGS. 5 and 6 of U.S. Pat. No. 3,930,682 entitled "Safety Belt Tension-Relieving Apparatus" filed Sept. 30, 1974 in the name of F. Booth.

In operation, the pressure sensitive switch 32 in the back portion 34 of the seat senses a condition when a seated occupant 36 leans back far enough so that the small of his back presses against the back portion 34 of his seat and against the pressure sensing switch 32 therein. The pressure exerted by the small of the seated occupant's back against the pressure sensing switch 32 produces a signal from the pressure sensing switch 32 which triggers the force transmitting means 12. The signal may be an electrical signal. When the force transmitting means 12 is triggered, it moves the clamp 20 against the support 6, thereby opposing further rewinding of the shoulder belt 2 into the retractor. Such opposition by the clamp 20 to the biasing means in the rewind mechanism of the retractor relieves tension exerted by the rewind mechanism on the shoulder belt and on the shoulder of the occupant 36 wearing the shoulder belt 2. As the seated occupant 36 leans back in his seat, the lower back of the seated occupant 36 presses against the lower portion of the seat back 34 and against the pressure sensing switch 32 before the upper back of the seated occupant 36 reaches the upper portion of the seat back. When the upper back of the seated occupant 36 reaches the seat back, a small amount of slack (about 2–6 inches) is produced in the shoulder belt 2 because the clamping action of the clamp 20 had taken place a short interval of time (a fraction of a second or a few seconds) prior thereto. In other words, the locking action on the shoulder belt 2 takes place when the lower back of the seated occupant 36 leans against the back portion of the seat, rather than when the upper back of the seated occupant 36 leans against the back portion 34 of the seat. Examples of the pressure sensing means for use with this invention are disclosed in U.S. Pat. Nos. 3,784,352 to Fontaine; 3,718,791 to Szablowski and 3,784,769 to Brill.

The remote tension-relieving apparatus of the present invention provides a simple, effective, easy to use, easy to manufacture, easy to install apparatus for relieving tension of a shoulder belt when in use by a seated occupant 36, either a passenger or a driver, in a vehicle.

We claim:

1. In a vehicle safety belt system adapted to restrain an occupant in a vehicle, the safety belt system including a shoulder belt and a retractor having a rewind mechanism biased to rewind the shoulder belt on a reel of the retractor, an improved tension-relieving apparatus comprising:

a housing disposed in a position remote from said retractor and having an approximately U-shape including a back wall and two sidewalls, said sidewalls extending approximately perpendicularly from said back wall;

a shoulder belt support disposed within said housing and extending between said sidewalls, said shoulder belt moving more than 90° around said support as said shoulder belt is unwound from said retractor and rewound into said retractor;

a locking means disposed adjacent to said shoulder belt support, said locking means including a clamp pivotably disposed with said housing and extending between said sidewalls, said clamp having a locking position and an unlocking position, said clamp movable between its locking position and its unlocking position, said clamp in its locking position preventing movement of the shoulder belt in a rewind direction around said shoulder belt support;

a force transmitting means mounted in said housing adjacent to said locking means, said force transmitting means connected to said locking means and an actuating means, said force transmitting means moving said clamp between its locking position and its unlocking position, said clamp in its locking position relieving tension on the shoulder belt produced by the rewind mechanism of the retractor; and an actuating means located in the vehicle remote from said housing and having electrical means connected to said force transmitting means for actuating said force transmitting means.

2. The improved tension-relieving apparatus according to claim 1 wherein: said force transmitting means is a solenoid having a plunger connected directly to said clamp.

3. The improved tension-relieving apparatus according to claim 1 wherein: the force transmitting means is a solenoid having a plunger; and said locking means further includes a linkage means, one end of said linkage means connected to said solenoid plunger, the other end of said linkage means connected to said clamp.

4. The improved tension-relieving apparatus according to claim 1 wherein: said actuating means is a pressure sensitive switch disposed in a back of a vehicle seat.

* * * * *